(12) United States Patent
Peretz et al.

(10) Patent No.: US 12,020,290 B1
(45) Date of Patent: *Jun. 25, 2024

(54) GENERATING A PROPOSED BID

(71) Applicant: Google LLC, Mountain View, CA (US)

(72) Inventors: Ervin Peretz, Redmond, WA (US); Sasank Mudunuri, San Francisco, CA (US)

(73) Assignee: Google LLC, Mountain View, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/698,839

(22) Filed: Mar. 18, 2022

Related U.S. Application Data (63) Continuation of application No. 17/118,175, filed on Dec. 10, 2020, now Pat. No. 11,823,236, which is a continuation of application No. 16/052,841, filed on Aug. 2, 2018, now Pat. No. 10,956,944, which is a continuation of application No. 14/753,164, filed on Jun. 29, 2015, now Pat. No. 10,068,260, which is a continuation of application No. 13/620,580, filed on
(Continued)

(51) Int. Cl.
*G06Q 30/00* (2023.01)
*G06Q 30/0273* (2023.01)

(52) U.S. Cl.
CPC ................ *G06Q 30/0275* (2013.01)

(58) Field of Classification Search
None
See application file for complete search history.

(56) References Cited

U.S. PATENT DOCUMENTS

| 6,415,270 B1 * | 7/2002 | Rackson | G06Q 30/02 |
| | | | 705/36 R |
| 6,763,334 B1 * | 7/2004 | Matsumoto | G06Q 30/02 |
| | | | 705/14.69 |

(Continued)

FOREIGN PATENT DOCUMENTS

| JP | 2005-309547 | 11/2005 | |
| JP | 2005309547 A * | 11/2005 | ............. G06F 13/00 |

(Continued)

OTHER PUBLICATIONS

Ren et al. Bidding Machine: Learning to Bid for Directly Optimizing Profits in Display Advertising. (Aug. 2015). Retrieved online Jun. 16, 2018. http://www.mediagamma.com/uploads/bid-machine.compressed.pdf (Year: 2015).*

(Continued)

*Primary Examiner* — James A Reagan
(74) *Attorney, Agent, or Firm* — Fish & Richardson P.C.

(57) ABSTRACT

A computer-implemented method for generating a proposed bid includes receiving an input generated by a first content provider as part of a bidding process where content providers bid for opportunities to provide content for publication. The input indicates (i) a resource for publishing first content from the first content provider and (ii) a campaign characteristic associated with the first content. The method includes determining a proposed bid for the first content provider based on the input and on historical data from the bidding process associated with the resource. The method includes presenting the proposed bid to the first content provider.

20 Claims, 4 Drawing Sheets

Related U.S. Application Data

Sep. 14, 2012, now Pat. No. 9,076,166, which is a continuation of application No. 12/394,249, filed on Feb. 27, 2009, now Pat. No. 8,315,908.

(56) References Cited

U.S. PATENT DOCUMENTS

| | | | |
|---|---|---|---|
| 6,892,186 B1 | 5/2005 | Preist | |
| 6,907,566 B1 | 6/2005 | McElfresh et al. | |
| 6,963,854 B1* | 11/2005 | Boyd | G06Q 30/0283 |
| | | | 705/1.1 |
| 7,120,599 B2 | 10/2006 | Keyes | |
| 7,130,808 B1* | 10/2006 | Ranka | G06Q 10/06315 |
| | | | 705/14.43 |
| 7,139,733 B2 | 11/2006 | Cao et al. | |
| 7,191,157 B1 | 3/2007 | Abe | |
| 7,225,182 B2* | 5/2007 | Paine | G06Q 30/02 |
| | | | 707/E17.108 |
| 7,231,358 B2 | 6/2007 | Singh | |
| 7,499,874 B2 | 3/2009 | Singh et al. | |
| 7,752,190 B2* | 7/2010 | Skinner | G06Q 30/0256 |
| | | | 707/706 |
| 7,908,238 B1 | 3/2011 | Nolet et al. | |
| 7,945,496 B2 | 5/2011 | Trott et al. | |
| 8,121,883 B2 | 2/2012 | Johnson et al. | |
| 8,175,950 B1 | 5/2012 | Grebeck et al. | |
| 8,234,276 B2 | 7/2012 | Skinner | |
| 8,255,285 B1 | 8/2012 | Peretz et al. | |
| 8,271,325 B2 | 9/2012 | Silverman et al. | |
| 8,315,908 B1 | 11/2012 | Peretz et al. | |
| 8,352,355 B2 | 1/2013 | Ettl et al. | |
| 8,370,197 B2 | 2/2013 | Axe et al. | |
| 8,412,559 B2 | 4/2013 | Hearnes, II | |
| 8,412,575 B2 | 4/2013 | Labio et al. | |
| 8,447,651 B1 | 5/2013 | Scholl et al. | |
| 9,076,166 B1* | 7/2015 | Peretz | G06Q 10/00 |
| 2001/0037278 A1 | 11/2001 | Messmer et al. | |
| 2001/0051940 A1 | 12/2001 | Soulanille | |
| 2002/0128904 A1 | 9/2002 | Carruthers et al. | |
| 2002/0133398 A1* | 9/2002 | Geller | G06Q 30/0272 |
| | | | 705/14.55 |
| 2003/0088525 A1* | 5/2003 | Velez | G06Q 30/02 |
| | | | 705/400 |
| 2003/0093357 A1 | 5/2003 | Guler et al. | |
| 2003/0105677 A1 | 6/2003 | Skinner | |
| 2003/0163410 A1* | 8/2003 | Byde | G06Q 30/08 |
| | | | 705/37 |
| 2003/0195832 A1* | 10/2003 | Cao | G06Q 30/08 |
| | | | 705/37 |
| 2003/0220773 A1 | 11/2003 | Haas et al. | |
| 2003/0233315 A1 | 12/2003 | Byde et al. | |
| 2004/0167816 A1 | 8/2004 | Kamath | |
| 2005/0065844 A1* | 3/2005 | Raj | G06Q 30/02 |
| | | | 705/14.48 |
| 2006/0026064 A1 | 2/2006 | Collins | |
| 2006/0074747 A1* | 4/2006 | Kline | G06Q 30/0253 |
| | | | 705/14.57 |
| 2006/0074749 A1* | 4/2006 | Kline | G06Q 30/02 |
| | | | 705/14.69 |
| 2006/0206516 A1* | 9/2006 | Mason | G06Q 30/02 |
| | | | 707/999.102 |
| 2007/0005421 A1* | 1/2007 | Labio | G06Q 30/0247 |
| | | | 705/14.54 |
| 2007/0027762 A1* | 2/2007 | Collins | G06Q 30/0242 |
| | | | 705/14.66 |
| 2007/0033096 A1* | 2/2007 | Jeong | G06Q 10/06375 |
| | | | 705/7.37 |
| 2007/0130009 A1 | 6/2007 | Steelberg et al. | |
| 2007/0143171 A1 | 6/2007 | Boyd et al. | |
| 2007/0157245 A1* | 7/2007 | Collins | G06F 40/30 |
| | | | 725/35 |
| 2007/0174114 A1* | 7/2007 | Bigby | G06Q 30/0246 |
| | | | 705/14.52 |
| 2007/0288983 A1 | 12/2007 | Sheeman et al. | |
| 2008/0021791 A1 | 1/2008 | Steelberg et al. | |
| 2008/0065479 A1* | 3/2008 | Tomlin | G06Q 10/04 |
| | | | 705/14.43 |
| 2008/0097813 A1* | 4/2008 | Collins | G06Q 30/02 |
| | | | 705/14.48 |
| 2008/0154664 A1* | 6/2008 | Kuo | G06Q 10/0635 |
| | | | 705/14.47 |
| 2008/0255915 A1 | 10/2008 | Collins et al. | |
| 2009/0099902 A1 | 4/2009 | Chatter et al. | |
| 2009/0106096 A1* | 4/2009 | Horowitz | G06Q 30/0226 |
| | | | 705/14.27 |
| 2009/0150224 A1 | 6/2009 | Lu et al. | |
| 2009/0222316 A1* | 9/2009 | Boinepalli | G06Q 30/00 |
| | | | 705/7.29 |
| 2009/0259550 A1 | 10/2009 | Mihelich et al. | |
| 2009/0313126 A1 | 12/2009 | Jain et al. | |
| 2009/0319333 A1 | 12/2009 | Dangaltchev | |
| 2009/0327083 A1* | 12/2009 | Mathew | G06Q 30/02 |
| | | | 705/14.69 |
| 2010/0076894 A1* | 3/2010 | McAfee | G06Q 30/02 |
| | | | 705/80 |
| 2010/0094673 A1 | 4/2010 | Lobo et al. | |
| 2010/0100471 A1* | 4/2010 | Li | G06Q 30/02 |
| | | | 705/37 |
| 2010/0114716 A1 | 5/2010 | Heilig et al. | |
| 2010/0198695 A1 | 8/2010 | Muthukrishnan et al. | |
| 2010/0318436 A1 | 12/2010 | Jain et al. | |
| 2011/0173063 A1 | 7/2011 | Bhatia et al. | |
| 2013/0066725 A1* | 3/2013 | Umeda | G06Q 30/0275 |
| | | | 705/14.66 |
| 2014/0229273 A1 | 8/2014 | Martinez et al. | |

FOREIGN PATENT DOCUMENTS

| | | | | |
|---|---|---|---|---|
| WO | WO 2007131069 | 11/2007 | | |
| WO | WO-2007131069 A2 * | 11/2007 | ....... | H04N 21/44222 |
| WO | WO 2009020976 | 2/2009 | | |
| WO | WO-2009020976 A1 * | 2/2009 | ......... | G06Q 30/0185 |

OTHER PUBLICATIONS

Professor Hossein Arsham. Time-Critical Decision Making for Business Administration. (Mar. 1, 2006). Retrieved online Jan. 28, 2021. http://home.ubalt.edu/ntsbarsh/stat-data/forecast.htm (Year: 2006).*

Andrei Z. Broder et al. Search Advertising using Web Relevance Feedback. (Oct. 30, 2008). Retrieved online Jan. 28, 2021. http://www.fontoura.org/papers/cikm2008-onix.pdf (Year: 2008).*

Howard Barich and Philip Kotler. "A Framework for Marketing Image Management." (Jan. 15, 1991). Retrieved online Dec. 19, 2022. https://sloanreview.mit.edu/article/a-framework-for-marketing-image-management/ (Year: 1991).*

David J.C. MacKay. "Information Theory, Inference, and Learning Algorithms." (2003). Retrieved online Dec. 19, 2022. https://www.inference.org.uk/itprnn/book.pdf (Year: 2003).*

Broder et al., "Search advertising using web relevance feedback," Proceedings of the 17th ACM conference on information and knowledge management, Oct. 2008, 1013-1022.

Home.ubalt.edu [online], "Time-Critical Decision Making for Business Administration" Mar. 1, 2006, retrieved on Jan. 28, 2021, retrieved from URL <http://home.ubalt.edu/ntsbarsh/stat-data/forecast.htm>, 1-107.

Notice of Allowance issued in U.S. Appl. No. 12/394,249, dated Jul. 19, 2012, 16 pages.

Notice of Allowance issued in U.S. Appl. No. 13/620,580, dated Mar. 5, 2015, 15 pages.

Notice of Allowance issued in U.S. Appl. No. 14/753,164, dated Jun. 28, 2018, 11 pages.

Office Action issue din U.S. Appl. No. 14/753,164, dated Mar. 14, 2018, 25 pages.

Office Action issued in U.S. Appl. No. 12/394,249, dated Apr. 16, 2012, 18 pages.

Office Action issued in U.S. Appl. No. 12/394,249, dated Jun. 10, 2011, 23 pages.

(56) References Cited

OTHER PUBLICATIONS

Office Action issued in U.S. Appl. No. 13/620,580, dated Apr. 10, 2013, 24 pages.
Office Action issued in U.S. Appl. No. 13/620,580, dated Jan. 28, 2014, 21 pages.
Office Action issued in U.S. Appl. No. 13/620,580, dated Jul. 23, 2014, 23 pages.
Office Action issued in U.S. Appl. No. 13/620,580, dated Sep. 25, 2013, 16 pages.
Office Action issued in U.S. Appl. No. 14/753,164, dated Sep. 20, 2017, 24 pages.
Ren et al., "Bidding machine: Learning to bid for directly optimizing profits in display advertising." Journal of Late X Class Files, vol. 14, No. 8, Aug. 2015, 1-14.
Broder et al., "Search advertising using web relevance feedback." Proceedings of the 17th ACM conference on information and knowledge management, Oct. 2008, 10 pages.
David MacKay, "Information theory, inference and learning algorithms" Cambridge University Press, Sep. 2003, 640 pages.
Sloanreview.mit.edu [online], "A Framework for Marketing Image Management." Jan. 1991, retrieved on Dec. 27, 2022, retrieved from URL <www.sloanreview.mit.edu/article/a-framework-for-marketing-image-management>, 3 pages.

* cited by examiner

GENERATING A PROPOSED BID

CROSS-REFERENCE TO RELATED APPLICATIONS

This application is a continuation of U.S. application Ser. No. 17/118,175, filed on Dec. 10, 2020, which is a continuation of U.S. application Ser. No. 16/052,841, now U.S. Pat. No. 10,956,944, filed on Aug. 2, 2018, which is a continuation of U.S. application Ser. No. 14/753,164, now U.S. Pat. No. 10,068,260, filed on Jun. 29, 2015, which is a continuation of U.S. application Ser. No. 13/620,580, now U.S. Pat. No. 9,076,166, filed on Sep. 14, 2012, which is a continuation of U.S. application Ser. No. 12/394,249, now U.S. Pat. No. 8,315,908, filed on Feb. 27, 2009, which are hereby incorporated by reference in their entirety.

TECHNICAL FIELD

This document relates to information processing.

BACKGROUND

Advertisers can run advertisement campaigns in any of multiple different platforms, including the Internet, television, radio, printed media and billboards. Advertisements used in advertising campaigns can cover a range of products and services and can be directed toward specific audiences or more generally toward the greater population. For example, publishers operating websites can provide space to advertisers for presenting advertisements. Advertisements presented on a website are sometimes selected based on the content of the website.

SUMMARY

In a first aspect, a computer-implemented method for generating a proposed bid includes receiving an input generated by a first content provider as part of a bidding process where content providers bid for opportunities to provide content for publication. The input indicates (i) a resource for publishing first content from the first content provider and (ii) a campaign characteristic associated with the first content. The method includes determining a proposed bid for the first content provider based on the input and on historical data from the bidding process associated with the resource. The method includes presenting the proposed bid to the first content provider.

Implementations can include any, all or none of the following features. The proposed bid can be presented in a bidding screen generated on a display device, the bidding screen configured for the first content provider to submit a bid in the bidding process for publishing the first content. The campaign characteristic can include a goal selected by the first content provider for a campaign that includes the first content. The goal can include a budget for the campaign. The campaign can include electronic publishing of the first content, and the goal can include a number of impressions that the first content is to receive in the campaign. Determining the proposed bid can include maximizing a value of the campaign for the first content provider within the goal. The proposed bid can indicate a bid amount that based on the historical data is required to win the bidding process for the resource. Determining the proposed bid can include generating a model of the bidding process based on the historical data; projecting a bidding condition at a future date specified for the first content, the bidding condition projected using the model; and selecting the proposed bid based on the bidding condition. The first content can be an advertisement, the first content provider can be an advertiser seeking to publish the advertisement, the resource can be at least one page available for receiving advertising, and the proposed bid can include at least a bid amount.

In a second aspect, a computer-implemented method for generating a proposed bid includes generating a graphical user interface (GUI) to be used by advertisers in an advertisement bidding process, the GUI configured for the advertisers to choose between a plurality of pages and to submit bids in a bidding process for rights to electronically display advertisements on at least one selected page. The method includes receiving an input generated by a first advertiser as part of the bidding process. The input indicates (i) a selection of at least a first page among the plurality of pages for publishing a first advertisement from the first advertiser; (ii) a campaign goal for an advertising campaign associated with the first advertisement, the campaign goal including at least one of a budget and a number of impressions that the first advertisement is to receive in the advertising campaign; and (iii) a future date for conducting the advertising campaign. The method includes identifying historical data gathered in the bidding process relating to the first page, the historical data indicating outcomes of previous auctions for placing advertisements on the first page. The method includes generating a model of the bidding process based on the historical data. The method includes projecting a bidding condition at the future date using the model, the bidding condition indicating at least a bid amount that based on the historical data is required to win the bidding process for the first page. The method includes determining a proposed bid for the first advertiser based on the input and on the bidding condition. The method includes presenting the proposed bid to the first advertiser in the GUI, wherein the GUI is configured so that the first advertiser can choose between accepting the proposed bid and submitting another bid for the advertising campaign.

In a third aspect, a graphical user interface for generating a proposed bid includes a first input control for a first content provider to generate an input as part of a bidding process where content providers bid for opportunities to provide content for publication. The input control configures the input to indicate (i) a resource for publishing first content from the first content provider and (ii) a campaign characteristic associated with the first content. The graphical user interface includes a bid proposal area presenting a proposed bid to the first content provider, the proposed bid determined for the first content provider based on the input and on historical data from the bidding process associated with the resource.

Implementations can include any, all or none of the following features. The bid proposal area can include a bid entry area for entering a bid for the advertising campaign. The graphical user interface can be configured so that the first advertiser can choose between accepting the proposed bid and submitting the other bid for the advertising campaign. The campaign characteristic can include a goal selected by the first content provider for a campaign that includes the first content. The goal can include a budget for the campaign. The campaign can include electronic publishing of the first content, and the goal can include a number of impressions that the first content is to receive in the campaign. The proposed bid can indicate a bid amount that based on the historical data is required to win the bidding process for the resource.

Implementations can provide any, all or none of the following advantages. Content distribution such as advertising can be improved. A more efficient approach for matching content distributors with content publishers can be provided. Content distribution can be improved by providing a suggested bid for content distribution based on past data. More accurate bids can be provided to distributors, for example in order to reduce bids that are too low and result in under-delivery of content, and bids that are too high and result in inefficient use of money.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
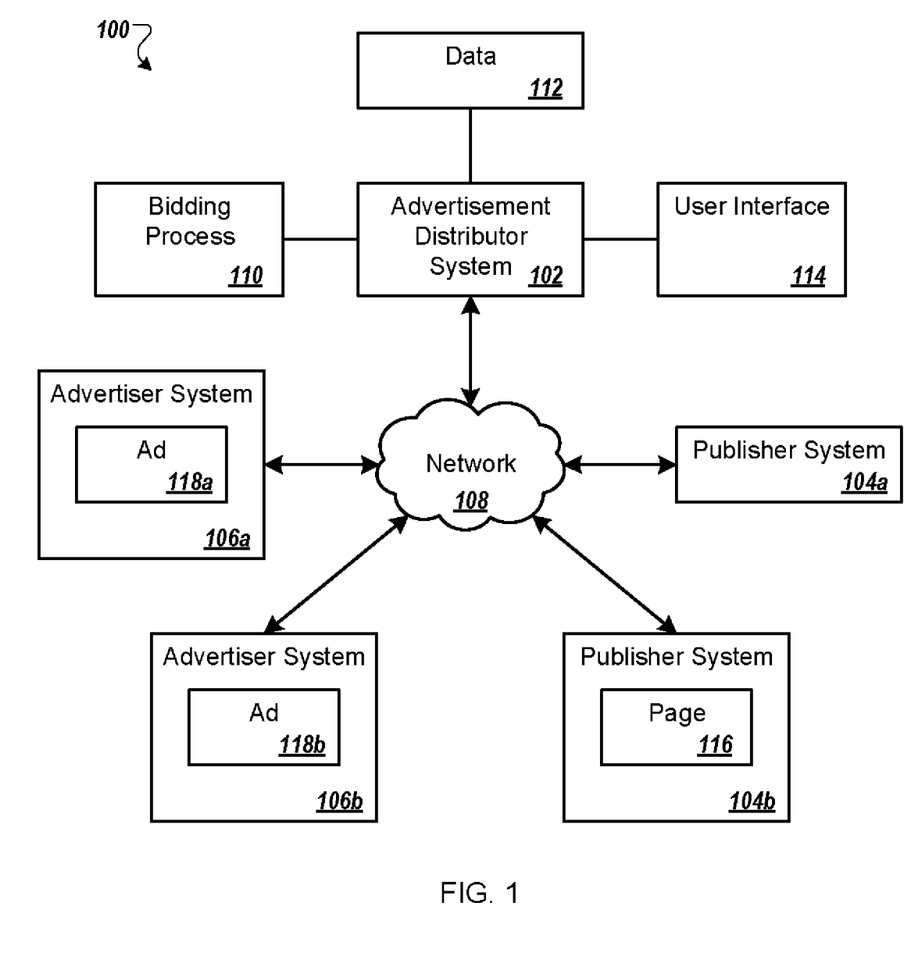
FIG. 1 is an example system that can be used for generating content distribution bid proposals and displaying content.

FIG. 1 is an example system 100 that can be used for generating content distribution bid proposals and displaying content. The system 100 can be used for distribution of any type of contents, including media, images, text, data, graphics, or any other kind of information. In some implementations, at least part of the content being distributed can include an advertisement, and an advertiser can submit a bid in a bidding process to have the advertisement or other content distributed in an advertisement campaign. For example, the advertising campaign can take into account advertiser goals, such as the number of daily impressions, maximizing the number of unique viewers of the advertisement, or the type of audience viewing the advertisements. Some other goals can include minimizing cost of the advertising campaign, distributing the budget evenly across the desired sites the advertisement will be displayed on, or some combination thereof. Historical advertising campaign data can, for example, be used to generate a model of future advertising campaigns. The historical data can be used in the generation of the advertisement campaign bid proposal. In some implementations, the system 100 can use historical data and advertiser goals in order to generate and propose a suggested bid for distributing content, such as an advertisement campaign bid to an advertiser.

In some implementations, content, such as an advertisement, can include any form of communication in which one or more products, services, ideas, messages, people, organizations or other items are identified and promoted, or otherwise communicated. Advertisements are not limited to commercial promotions or other communications. An advertisement may be a public service announcement or any other type of notice, such as a public notice published in printed or electronic press or a broadcast. An advertisement may be referred to or include sponsored content.

Contents, such as advertisements, can be communicated via any of various mediums and in various forms. In some examples, advertisements may be communicated through an interactive medium, such as the Internet, and may include graphical advertisements (e.g., banner advertisements), textual advertisements, image advertisements, audio advertisements, video advertisements, advertisements combining one of more of any of such components, or any form of electronically delivered advertisement, to name a few examples. Contents can include embedded information, such as embedded media, links, meta-information, and/or machine executable instructions. Contents can be communicated through RSS (Really Simple Syndication) feeds, radio channels, television channels, print media, and other media, for example.

Here, the system 100 includes an advertisement distributor system 102, publisher systems 104a-b, advertiser systems 106a-b, and any kind of network 108. The advertisement distributor system 102, publisher systems 104a-b, and advertiser systems 106a-b can communicate via any kind of network 108. The network 108 can, for example, include a wide area network (WAN), local area network (LAN), an intranet, the Internet, a telephone connection, or any other form of connection. In some implementations, publisher systems 104a-b are the same publisher system, or can include two or more publisher systems. The publisher systems 104a-b can, for example, be distributed over one or more physical machines. In some implementations, the advertiser systems 106a-b can be the same system, or can include two or more advertiser systems. The advertiser systems 106a-b can, for example, reside on the same physical machine or on two or more physical machines. Examples of physical machines include computer servers, personal computers (e.g., desktop computers), mobile computing devices, media devices, or other electronic devices and the like.

The advertisement distributor system 102 can be used for distribution of any kind of content, such as advertisements. Here, the advertisement distributor system 102 is associated with a bidding process 110, data 112, and a user interface 114. For example, the bidding process 110 can facilitate bid submission by advertisers or other content providers; collect and evaluate submitted bids; and award content distribution rights to one or more bidders according to one or more rules. Rules can include awarding rights to the highest bidder, or in recognition of services performed (e.g., because of the community commitment of the content provider), to name a few examples. In some implementations, the advertisement distributor system 102 and/or the bidding process 110 can generate one or more advertisement campaign proposals and present the proposals to a prospective bidder. For example, a proposal can help a prospective bidder to avoid over- or underbidding in a particular bidding process. In some implementations, the proposals are submitted to the advertisement distributor system 102, publisher system 104a, or publisher system 104b. The advertisement distributor system 102 can, for example, be associated with an advertiser system or a publisher system, such as the advertiser system 106a or the publisher system 104b. For example, if the advertisement distributor system 102 receives the submitted proposal, the bid proposal can be sent to a publisher system associated with the advertisement distributor system 102. In other implementations, the advertisement distributor system 102 can accept bids and/or grant distribution rights on behalf of a publisher system, such as publisher system 104a. The advertisement distributor system 102 can, for example, track information related to submitted bid proposals.

An advertisement campaign proposal can relate to any kind of contents such as one or more advertisements. When an advertisement campaign includes multiple advertisements, the advertisements can be for related goods or services, or for unrelated goods or services. In some implementations, the advertisements are of a similar creative type or of a variety of creative types. Creative types can, for example, include text advertisements, video advertisements, image advertisements, audio advertisements, or gadgets, to name a few examples.

The advertisement distributor system 102 can, for example, use historical data, such as data 112, for the generation of a model of the advertisement bidding process. The advertisement bidding process model can be used to create an advertisement campaign proposal. The data 112 can include historical information on previous advertisement campaigns including the website(s) used, the goals of previous campaigns, the cost per thousand impressions (CPM), the daily pageviews, or the number of unique viewers of the campaigns, among others. Historical data can include region information, such as information on the cost of advertising campaigns or the number of daily impression views in certain countries, states, provinces, or cities, to name a few examples. Historical data can, for example, include information related to any other type of content campaign.

In some implementations, the advertisement distributor system 102 can generate a model of the advertisement bidding process in real time. This can, for example, provide more accurate bidding process models. In other implementations, the generation of model of the content bidding process can be run on a schedule, such as weekly, monthly, or at any other time interval. For example, a schedule can be selected based on the performance or accuracy of a campaign proposals created from the bidding process model, time and/or cost considerations for the generation of the bidding process model (e.g., computation time), or any other criteria.

For example, the advertisement distributor system 102 can take into account the date of the data 112 and the date for the desired advertising campaign in the generation of the proposal. The advertisement distributor system 102 can determine patterns based on time of year, season, holidays, or other date related trends, that may influence an advertising campaign. In some implementations, more recent historical data will have more of an influence on the advertisement distributor system 102 compared to historical data that is a few years old. In other implementations, historical data that is a year or two old will have more weight in the generation of a bid proposal than historical data for an advertising campaign that occurred a week before the generation of the proposal. In certain implementations, the advertisement distributor system 102 can generate one or more advertisement campaign proposals. For example, the advertisement distributor system 102 can generate a bid proposal for the advertisement campaign if the campaign started the day after the proposal is presented to the user, and generate another proposal for a week later, or any other combination of number of proposals and campaign start dates. The one or more advertisement campaign proposals can be presented to the user in an overview with navigation to more specific data for each of the different proposals (e.g., on a computer display).

The advertisement distributor system 102 can, for example, analyze the data 112 using one or more of logistic regression, Poisson regression, linear regression, or non-parametric regression, to name a few examples. The advertisement distributor system 102 can use artificial intelligence, such as machine learning, to update the algorithm that generates the model for the advertising campaign bid proposal. Examples of machine learning algorithm types can include supervised learning, unsupervised learning (e.g., neural networks), reinforcement learning, or any other algorithm type. In some implementations, the advertisement distributor system 102 can receive submitted bid proposals and track information relating to the bid proposal. Tracked information can include acceptance rate of the bid proposal, success of the content campaign (e.g., how accurate the information provided in the bid proposal was in light of the campaign results), CPM value(s) included in the bid proposal, or forecasted number of impression, to name a few examples. Tracked information, or any other information relating to the submitted bid proposals, can, for example, be used to update the algorithm used to analyze the data 112, such as historical data, or the algorithm used to make projections of future bidding conditions.

In some implementations, the data 112 is collected by the advertisement distributor system 102. In other implementations, advertiser systems 106a-b and/or publisher systems 104a-b provide historical data to the advertisement distributor system 102 for the data 112. For example, the advertisement distributor system 102 can track information on all past bidding activities for content campaigns, both successful and unsuccessful. The tracked historical information can then be included in the data 112 for use in generating future content distribution bid proposals. In some implementations, bid history information is only collected with the permission of the bid submitting parties.

The proposed bid can represent an effort to inform the content provider about the level of bid that is likely to be necessary to win the bidding process. In some implementations, past bidding activities are taken into account, such as from the data 112, to estimate the bid amount for a successful submission. For example, the advertisement distributor system 102 can attempt to optimize the advertiser's bid by determining a lowest bid level that is statistically consistent with a predetermined likelihood of prevailing in the bidding process.

The user interface 114 can, for example, present the generated advertising campaign bid proposal to a user, such as an operator of the advertiser system 106b. The user interface 114 can be displayed in a web browser, in an applet, in a plug-in, or by any other kind of software application, to name a few examples. The bidding process 110, the data 112, and the user interface 114 can be managed by the same device such as a server, different devices, or a combination thereof. Examples of the devices running the bidding process 110, the data 112, and the user interface 114 can alternatively include, but are not limited to, personal computers, laptop computers, mobile computing devices, cell phones, smart phones, tablet computers, game consoles, media centers, media players, personal digital assistants (PDAs), television systems, audio systems, radio systems, removable storage devices, navigation systems, set top boxes, or some other form of electronic device instead of a server.

Publisher systems 104a-b can include any kind of media content, such as one or more websites, to present content to users. The content can include one or more pages, such as a page 116 owned by publisher system 104b. The publisher system 104a can, for example, have a website relating to news, and publisher system 104b can have a website relating to sporting goods, such as volleyball equipment. Publishers' media content can be configured for displaying one or more other content portions, such as advertisements or advertisement-related information, to users viewing the content. The advertisements can be for goods and/or services related to the content of the websites or for goods and/or services that users who typically view the website may be interested in, to name a few examples.

In some implementations, publisher systems 104a-b can offer content space directly to content providers, such as advertiser systems 106a-b. In other implementations, publisher systems 104a-b can offer content space to advertiser systems 106a-b through the advertisement distributor system 102. In some implementations, the advertisement distributor system 102 can host one or more servers for a publisher's media content, such as web servers for one or more websites owned by the publisher systems 104a-b.

The advertiser systems 106a-b can have stored therein one or more advertisements 118a-b respectively. Advertisements 118a-b can, for example, include one or more advertisement portions. If advertisement 118b includes more than one advertisement portion, the advertisement portions can relate to the same advertising campaign or to multiple advertising campaigns.

For example, the advertiser system 106a can use the user interface 114 to obtain a proposed bid for content distribution, such as an advertising campaign bid proposal for the advertisement 118a. In some implementations, the proposal can be obtained as follows. The advertiser system 106a can provide information on the desired goal of the advertising campaign. Advertising campaign goals can include a daily budget or a daily number of impressions, to name a few examples. Some additional goals can include maximization of individual impressions, presentation to a targeted audience type (e.g., based on demographic data), or distribution of the budget evenly between publisher websites. The advertisement distributor system 102 and/or the bidding process 110 can then perform relevant information processing and generate a proposed bid for the advertiser system 106a. The proposed bid can then be presented to the advertiser system 106a in the user interface 114.

Figure 2:
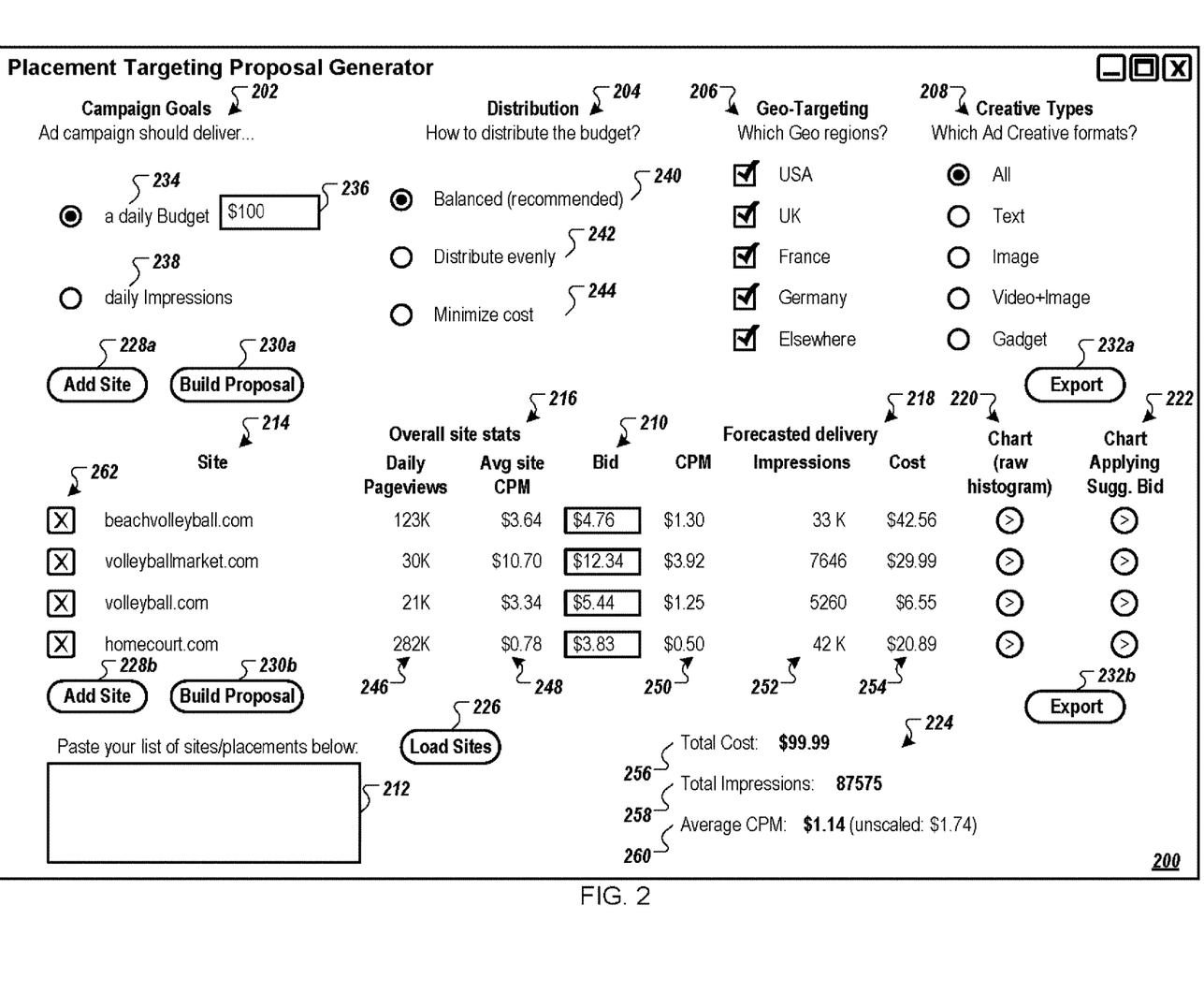
FIG. 2 is an example graphical user interface for generating a content distribution bid proposal.

FIG. 2 is an example graphical user interface 200 for generating a content distribution bid proposal. Here, the graphical user interface (GUI) 200 contains user editable content, including: a campaign goal control 202, a campaign goal distribution control 204, a geo-targeting control 206, a creative types control 208, a bid control 210, and an add to site list control 212. The GUI 200 can contain un-editable content such as a site list content 214, an overall site stats content 216, a forecasted delivery content 218, a chart (raw histogram) control 220, a chart applying suggested bid control 222 and a bid proposal summary content 224. The GUI 200 can contain one or more buttons for populating un-editable fields and manipulating data, such as a load sites button 226, add site buttons 228a-b, build proposal buttons 230a-b, and export buttons 232a-b. Any of the content, controls, or buttons contained in the GUI 200 can, for example, be selectable or otherwise clickable. Selection of the content, controls, or buttons can activate or trigger a pre-determined function. For example, selection of a button can bring up a menu or navigate to another screen. In some implementations, selection of the content, controls, or buttons can bring up a help menu, provide information about the content, controls, or buttons, explain how to use the content, controls, or buttons, or present any other type of information.

In some implementations, a user, such as an operator of the advertiser system 106a, uses the GUI 200 to submit a bid for a content campaign (e.g., an advertising campaign). In so doing, the user can be presented with one or more bid proposals that can aid the user in deciding whether to place the bid or which amount to submit, for example. The user interface 114 can, for example, display the GUI 200 to the operator of advertiser system 106a. The campaign goal control 202 allows the user to select the goal of the content campaign. The advertisement distributor system 102 can, for example, use the goal to determine a proposed content distribution bid that is most likely to win the bidding process. The campaign goal control 202 includes a daily budget radio button 234, a daily budget field 236, and a daily impressions radio button 238. Selection of the daily budget radio button 234 allows the user to enter in the desired daily spending budge in the daily budget field 236. In this example, a daily budget of $100 is entered in the daily budget field 236.

Here, when the daily budget radio button 234 is selected, the user has three options for the campaign goal distribution control 204. In other implementations, alternate campaign distribution options can be provided, such as selection of the highest cost content space, purchase of content space with the most views (e.g., television, radio, billboards, mailings), or random distribution of costs, to name a few examples. The campaign goal distribution control 204 includes a balanced radio button 240, a distribute evenly radio button 242, and a minimize cost radio button 244.

In some implementations, the balanced radio button 240 can be used to select as a high level goal the best value and impact possible for a campaign. For example, the proposed bid selected by the advertisement distributor system 102 based on selection of the balanced radio button 240 can present the user with a media content campaign that maximizes the size of the target audience with the lowest cost impression possible to meet the goal. User selection of the distribute evenly radio button 242 can select a goal for a media content campaign that distributes the budget evenly between content space, such as publisher system websites. For example, if a user entered a budget of $100 in the daily budget field 236 and selected four publisher websites, such as those in the site list content 214, then the advertisement distributor system 102 would generate a proposed bid with a budget of $25 for each website for presentation to the user. Selection of the minimize cost radio button 244 can, for example, present the user with a proposed bid that distributes the budget between the cheapest impressions.

In some implementations, when the daily impressions radio button 238 is selected a daily impressions field (not shown), similar to the daily budget field 236, can be displayed in the GUI 200. The daily impressions radio button 238 can, for example, have one or more impression related goals displayed in the GUI 200 (e.g., contained within the campaign goal distribution control 204). Impression related goals can include minimizing cost of the desired daily impressions, distributing the impressions evenly between content space, distributing the daily impressions between the widest variety of content space types (e.g., websites, television, radio, newspaper) for the lowest cost, or distributing the impressions to the widest audience (e.g., the largest number of unique viewers), to name a few examples. With selection of the daily impressions radio button 238 and an appropriate distribution goal, the advertisement distributor system 102 can, for example, present the user with a proposed bid for a content campaign based on a daily impression count of the content. In some implementations, the user can be an operator of the advertiser system 106a and the content space can be page 116 owned by the publisher system 104*b*. The content campaign can, for example, be an advertising campaign for the advertisement 118*a*.

The geo-targeting control 206 can, for example, allow the user to select the desired geographical regions for the content campaign. Some types of regions can include countries, states, provinces, cities, time zones, climates, or any other type of region. Some countries can include the United States, the United Kingdom, France, or Germany, to name a few examples. The creative types control 208 can, for example, allow the user to select the campaign content type. Content types can include text, images, video, audio, graphics, media, gadgets, holograms, or any other type of information. In some implementations, the user can enter a date or date range for the content campaign into a field in the GUI 200 for use in the generation of the bid proposal. For example, if the content campaign is going to be during a specific future date range, the user can input that date or date range in order to receive a bid proposal for that date range. In other implementations, the bid proposal can be for a single day, a week, a month, or any other amount of time. In some implementations, the date for the bid proposal is predetermined, such as the following day, five days from the bid proposal, or a week from the date of the bid proposal, to name a few examples. For example, a user, such as an operator of the advertiser system 106*b*, can be involved in an auction for content space on a publisher system's website, such as publisher system 104*a*. The advertisement distributor system 102 can then be informed by the publisher system 104*a* of any date related information for the advertisement campaign. The date range can, for example, be continuous (e.g., five days in a row), or discontinuous (e.g., every Monday), to name a few examples.

In some implementations, the user can enter a maximum CPM bid amount in a field in the bid control 210 associated with a content space in the site list content 214. The association between the field and the content space can, for example, be presentation in a similar location in the GUI 200, such as the same row of the GUI 200. The user can add one or more content spaces, such as page 116, to the site list content 214 by entering content space into the add to site list control 212 and selecting the load sites button 226, for example. Alternatively, the user can select either of the add site buttons 228*a-b* to add content space to the site list content 214, to name a few examples. Selection of the add site button 228*a* can, for example, display a master list of content spaces to the user. In some implementations, users can remove content space from the site list content 214 with remove buttons 262.

Selection of either of the build proposal buttons 230*a-b* can, for example, populate fields in the GUI 200. For example, the advertisement distributor system 102 can populate the overall site stats content 216, the forecasted delivery content 218, the bid control 210, and the bid proposal summary content 224 with proposed content distribution bid information. In some implementations, if a user has entered information into the bid control 210, the advertisement distributor system 102 can overwrite the user entered information, or the advertisement distributor system 102 can use the information in the generation of a bid proposal and leave the information unchanged, to name a few examples.

The overall site stats content 216 includes daily pageviews content 246 and an average site CPM content 248. Historical data, such as data 112, can be used by the advertisement distributor system 102 to create a model of the bidding process. The advertisement distributor system 102 can, for example, use the historical data and/or the model of the bidding process to provide data to populate the overall site stats content 216. In some implementations, for each content space in the site list content 214 there can be associated daily pageview and average site CPM information, such information can be displayed in the daily pageviews content 246 and the average site CPM content 248. The daily pageview information can, for example, be the average number of views of the content space over the past week, month, or year, to name a few examples. The average site CPM information can be the average CPM for the past week, month, or any other period of time. In some implementations, the daily pageview information and the average site CPM information can be based on the same period of time, or in others they can be based on different time periods. The time period can, for example, be continuous (e.g., the last year), based on season (e.g., fall of the last four years, not counting the current year), holiday based, or any other period or combination of periods of time. In another implementation, the time period can be based on statistics of the content space or other content spaces. If the content space, such as page 116, for example, has only existed for two and a half months, the daily page view and the average site CPM information can be determined over that two and a half month period. Related or unrelated content space can, for example, determine the time period for the daily pageview and average site CPM information based on trends or other information about the content spaces.

The forecasted delivery content 218 includes CPM content 250, impressions content 252, and cost content 254. The advertisement distributor system 102 can populate the forecasted delivery content 218 with future content campaign projections (e.g., for campaigns at the date/date range specified by the user) based on the model of the bidding process and user input. For example, the forecasted delivery content 218 can be estimated values based on the future projection determined by the advertisement distributor system 102. The CPM content 250 can, for example, be the average CPM of the impressions presented on the associated content space as estimated in the proposed bid for the current campaign. The advertisement distributor system 102 can populate the fields in the bid control 210 with the proposed content distribution bid. The proposed content distribution bid can, for example, be the maximum CPM value(s) that the user would pay in order to display content on the content space.

For example, the advertisement distributor system 102 can present a proposed bid to an operator of the advertiser system 106*a* for a content campaign, such as an advertising campaign for advertisement 118*a*. The proposed bid can contain one or more content spaces, such as page 116 (e.g., beachvolleyball.com), owned by one or more publisher systems, such as the publisher system 104*b*. Continuing the example, the proposed bid can include information on the maximum CPM bid (e.g., $4.76) and the average CPM (e.g., $1.30). The actual CPM can range anywhere from $0.00 to $4.76 (e.g., the advertiser system 106*a* is not paying $4.76 for all of the impressions, only the most expensive impressions, if any). In this example, the impressions content 252 includes information on the number of impressions of advertisement 118*a* (e.g., 33K) and the cost content 254 includes information on the cost of presenting the advertisement 118*a* on the page 116 for a single day (e.g., $42.56). Here, the relationship between the average CPM information, the impressions information, and the cost information is the following: cost ($42.56)/average CPM ($1.30/1,000)=impressions in thousands (32,738≈33K).

The chart (raw histogram) control 220 can, for example, allow the user to view historical bidding data relating to content space. In some implementations, selection of the chart (raw histogram) control 220 can present a histogram, or any other type of chart, graph, or graphical presentation, for a content space to the user. The chart (raw histogram) control 220 can present data from the bidding process model created by the advertisement distributor system 102. For example, the chart (raw histogram) control 220 can present data related to the overall site stats content 216.

In some implementations, the chart applying suggested bid control 222 can present information used in the projection of future bidding conditions to the user. For example, the advertisement distributor system 102 can make a projection of future bidding conditions of a content space based on historical data and determine a bid proposal to present to the user. Selection of the chart applying suggested bid control 222 associated with the content space can present the projection of future bidding conditions of the content space to a user. While viewing the presented chart the user can, for example, see the current bid proposal and/or change the bid proposal by interacting with the chart, thereby updating a field in the bid control 210. Selection of the chart applying suggested bid control 222 can present the user with a chart, a graph, or any other type of graphical presentation of the information. In some implementations, the chart applying suggested bid control 222 can present the user with additional information, such as information relating to the likelihood that a bid proposal will win the bidding process. The user can, for example, select a different bid and see the probability of that bid winning the bidding process.

The bid proposal summary content 224 includes a total cost content 256, a total impressions content 258, and an average CPM content 260. The bid proposal summary content 224 can, for example, present the user with a proposed bid generated by the advertisement distributor system 102. The proposed bid can be based on input entered by the user into the GUI 200, a bidding condition projected by the advertisement distributor system 102, any combination thereof, or some other information or data. The total cost content 256 can display the total cost for the proposed bid. In some implementations, the total cost can be a daily cost, a weekly cost, a monthly cost, or the cost for the entire content campaign based on the date range entered by the user, to name a few examples. Here, the total daily cost is $99.99, just under the desired daily budget of $100. The cost content 254 can be used to determine the total cost of the proposed bid. For example, the sum of all the fields in the cost content 254 can add up or be near to the total cost of the proposed bid. The advertisement distributor system 102 can, for example, select the proposed bid based on the likelihood that the proposed bid will win the bidding process given the total cost of the bid and historical data. In some implementations, the advertisement distributor system 102 can present the user with an estimate of the chance or confidence that the user will win the bidding process. For example, if the user selects the balanced radio button 240, or some other optimized campaign goal distribution control 204, the advertisement distributor system 102 can attempt to optimize the content campaign by determining the lowest bid with a given probability of winning the bidding process.

The total impressions content 258 can be the total number of content impressions for the content campaign. For example, the advertisement distributor system 102 can present a user, such as an operator of the advertiser system 106a, with the total number of impressions of advertisement 118a for the content campaign. If the user selected a desired number of daily impressions as the goal for the content campaign, the total number of impressions can be the same as or similar to the desired number of daily impressions. Here, the total number of daily impressions for the content campaign is 87,575.

The average CPM content 260 can contain information from the advertisement distributor system 102 on the average CPM cost over the entire content campaign. The average CPM cost can be an un-scaled average of the values in the CPM content 250, a scaled average CPM (e.g., total cost/total impressions*one thousand), or an average CPM over a date range for a content campaign, to name a few examples. Here, the average CPM is $1.14 (e.g., $99.99/87,575*1,000) and the un-scaled average CPM is $1.74 (e.g., [$1.30+$3.92+$1.25+$0.50]/4).

In some implementations, a user can change any of content space, budget information, goal information, geo-targeting information, creative types, date range, and/or any other campaign related information after receiving a proposed bid. The user can, for example, request a new bid proposal by changing one or more input values and selecting the build proposal button 230a, leave the bid proposal process by exiting the GUI 200, or submit a bid proposal to a content publisher system, such as publisher system 104b, by selecting either of the export buttons 232a-b, to name a few examples. In some implementations, the user can modify a proposal one or more times by requesting a new proposal from the advertisement distributor system 102, submit a proposal, start a proposal for a new content campaign, or any combination thereof without exiting the GUI 200. The bidding process 110 can, for example, facilitate submission of bids from the advertiser system 106b to the publisher system 104b. The proposed bid can, for example, be for an auction of content space, or any other type of sale, lease, license, or transaction pertaining to information. For example, the bid proposal can be for an advertising campaign, such as a site-targeted campaign, a keyword campaign, or any other type of targeted or non-targeted campaign. The auction of the content space can be a live auction, or a silent auction, to name a few examples.

Figure 3:
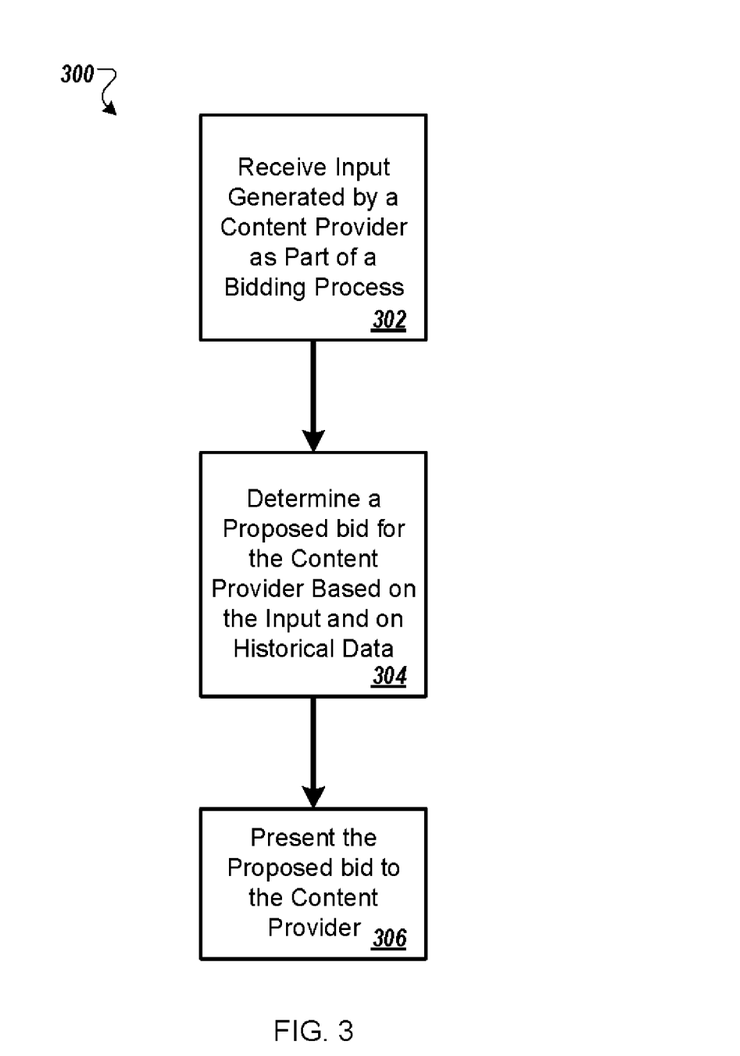
FIG. 3 is a flow chart of an example method that can be performed to present a proposed content distribution bid.

FIG. 3 is a flow chart of an example method 300 that can be performed to present a proposed content distribution bid. The method 300 can, for example, be used to generate a content distribution bid proposal and present the proposal to a user. The system 100 and parts thereof will be referred to in the following as examples. The method 300 can be performed by other systems in conjunction with or instead of the system 100. One or more steps of the method can be performed in a different order; as another example, more or fewer steps can be performed. The method 300 can be performed by a processor executing instructions stored in a computer program product.

Step 302 receives input generated by a first content provider as part of a bidding process where content providers bid for opportunities to provide content for publication. The input indicates a resource for publishing first content from the first content provider and a campaign characteristic associated with the first content.

For example, the advertisement distributor system 102 and/or bidding process 110 can receive input generated by a content provider, such as the advertiser system 106a. The input can be entered into the user interface 114 by an operator of the advertiser system 106a. In some implementations, the resource can include the page 116 owned by publisher system 104b. The resource can, for example, include one or more resources owned by one or more publisher systems. For example, the advertiser system 106a can select multiple pages or websites owned by more than one publisher system in order to obtain a bid proposal for content distribution, such as an advertising campaign, that presents an advertisement to a wider audience than if only websites from a single publisher system were selected. In other implementations, the resource can include a billboard, a wall, a sidewalk, a balloon, a newspaper, a television channel, a sports event, any combination thereof, or any other kind of media content type.

In some implementations, the campaign characteristic associated with the first content includes a goal selected by the first content provider for a campaign that includes the first content. The goal can include a budget for the advertising campaign, publishing a number of impressions of the first content, or maximizing a value of the campaign (e.g., the number of unique viewers of the first content), to name a few examples. Some other goals can include demographic information on the desired audience of the campaign, minimizing cost of the campaign, distribution of a value evenly across the campaign, or some combination thereof. The campaign characteristic can, for example, include one or more campaign characteristics.

In some implementations, the first content can include text, images, video, data, audio, or any other kind of media. The first content can, for example, include an advertisement, such as the advertisement 118a. The bidding process can be used to generate a content distribution bid proposal for the first content, such as a bid proposal for an advertising campaign. The first content can, for example, include more than one media or media type and the campaign characteristic can include individual goals for each of the media included in the first content.

Step 304 determines a proposed bid for the first content provider based on the input and on historical data from the bidding process associated with the resource. For example, the determination of a bid proposal can include generation of a model of the bidding process based on the historical data. The bid proposal can be based on a projection of a bidding condition at a future date specified for the first content, where the bidding condition is projected using the model of the bidding process.

For example, the data 112 can contain historical data on media campaigns associated with the page 116. The bidding process 110 can analyze the data 112 and generate a model of the historical bidding process for the page 112. The advertisement distributor system 102 can create a projection of a bidding condition at a future date for the advertisement 118a on the page 116. The campaign characteristic associated with the advertisement 118a can include the future date or dates of the advertising campaign. The advertisement distributor system 102 can, for example, determine the proposed bid based on the bidding condition at the future date for the advertisement 118a. The determination of the proposed bid can include maximization of a value of the campaign characteristic, such as the goals input by the advertiser system 106a and received by the advertisement distributor system 102.

Step 306 presents the proposed bid to the first content provider. For example, the proposed bid can be presented in a bidding screen generated on a display device. The display device can, for example, be a part of or connected to a server, a personal computer, or any other type of electronic device, such as a device running the user interface 114. The bidding screen can be configured for the first content provider, such as the advertiser system 106a, to submit a bid in the bidding process for publishing the first content. For example, the advertiser system 106a can submit the proposed bid to the publisher system 104a or the advertisement distributor system 102. The proposed bid can be used in an auction or any other type of sale of media content space. In some implementations, the proposed bid indicates a bid amount that based on historical data is likely to win the bidding process for the resource, such as media content space.

Figure 4:
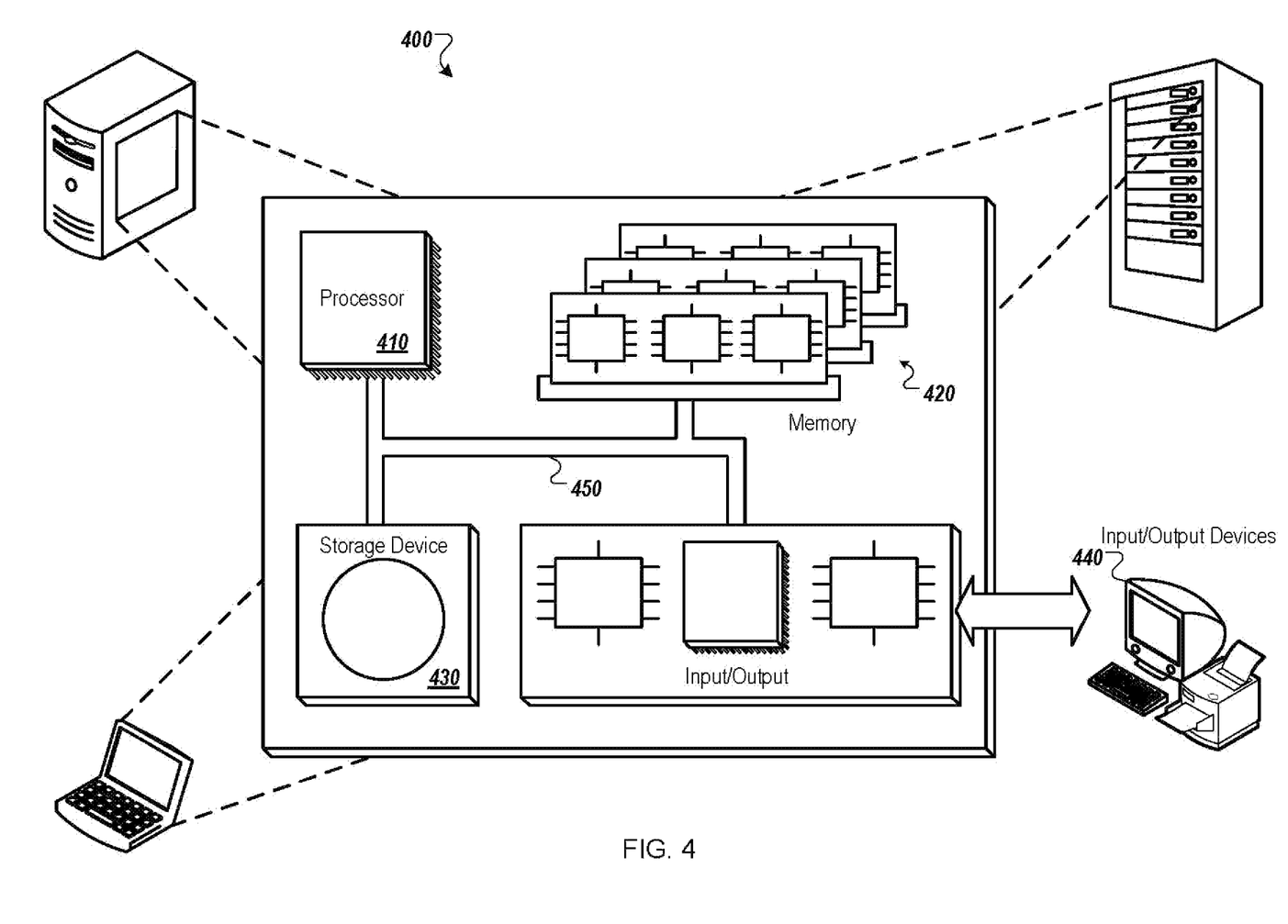
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method comprising:
   providing, by one or more processors, an interface through which data is exchanged with a client device;
   receiving, by the one or more processors and through the interface, input specifying (i) a future date range that includes future dates for publication of a content item, and (ii) a distribution goal from among a plurality of distribution goals, wherein the plurality of distribution goals includes having users take a specific action during the future date range;
   determining, by the one or more processors and using a model generated (a) using machine learning and (b) based at least on (i) history data that indicates one or more prior outcomes of processes through which other content items were distributed, and (ii) the distribution goal, an estimated number of unique devices that will be delivered the content item during the future date range;
   providing, by the one or more processors and through the interface, data indicating the estimated number of unique devices that will be delivered the content item during the date range;
   varying, by the one or more processors and during the future date range, a bid used to distribute the content item over multiple impression opportunities based on a statistical likelihood that distribution of the content item will contribute to achieving the distribution goal.

2. The method of claim 1, further comprising:
   in response to interaction with controls within a user interface, updating the user interface to present updated data indicating an updated estimated number of unique devices that will be delivered the content item during the date range according to changes corresponding to the interaction with the controls.

3. The method of claim 2, further comprising:
   receiving, through the user interface, a budget for distribution of the content item, wherein varying the bid comprises generating a proposed bid for publishing the content item over the future date range based on a target budget for distribution of the content item.

4. The method of claim 3, wherein generating the proposed bid is further based on a target number of impressions that the content item is to receive.

5. The method of claim 4, wherein the proposed bid indicates at least an amount required to win a distribution process for one or more publisher properties during the future date range.

6. The method of claim 5, wherein providing the interface comprises providing a graphical user interface that includes (i) first controls that enable a provider of the content item to specify the one or more publisher properties and (ii) second controls that enable the provider of the content item to specify one or more geographic regions to which the content item is to be distributed.

7. The method of claim 6, further comprising distributing the content item based on the proposed bid, the one or more publisher properties specified by input through the interface, and the one or more geographic regions specified by input through the interface.

8. A system comprising:
   one or more computers and one or more storage devices storing instructions that, when executed by the one or more computers, cause the one or more computers to perform operations comprising:
   providing an interface through which data is exchanged with a client device;
   receiving, through the interface, input specifying (i) a future date range that includes future dates for publication of a content item, and (ii) a distribution goal from among a plurality of distribution goals, wherein the plurality of distribution goals includes having users take a specific action during the future date range;
   determining, using a model generated (a) using machine learning and (b) based at least on (i) history data that indicates one or more prior outcomes of processes through which other content items were distributed, and (ii) the distribution goal, an estimated number of unique devices that will be delivered the content item during the future date range;
   providing, through the interface, data indicating the estimated number of unique devices that will be delivered the content item during the date range;
   varying, during the future date range, a bid used to distribute the content item over multiple impression opportunities based on a statistical likelihood that distribution of the content item will contribute to achieving the distribution goal.

9. The system of claim 8, wherein the instructions cause the one or more computers to perform operations further comprising:
in response to interaction with controls within a user interface, updating the user interface to present updated data indicating an updated estimated number of unique devices that will be delivered the content item during the date range according to changes corresponding to the interaction with the controls.

10. The system of claim 9, wherein the instructions cause the one or more computers to perform operations further comprising:
receiving, through the user interface, a budget for distribution of the content item, wherein varying the bid comprises generating a proposed bid for publishing the content item over the future date range based on a target budget for distribution of the content item.

11. The system of claim 10, wherein generating the proposed bid is further based on a target number of impressions that the content item is to receive.

12. The system of claim 11, wherein the proposed bid indicates at least an amount required to win a distribution process for one or more publisher properties during the future date range.

13. The system of claim 12, wherein providing the interface comprises providing a graphical user interface that includes (i) first controls that enable a provider of the content item to specify the one or more publisher properties and (ii) second controls that enable the provider of the content item to specify one or more geographic regions to which the content item is to be distributed.

14. The system of claim 13, wherein the instructions cause the one or more computers to perform operations further comprising distributing the content item based on the proposed bid, the one or more publisher properties specified by input through the interface, and the one or more geographic regions specified by input through the interface.

15. A non-transitory computer-readable medium storing software comprising instructions executable by one or more computers which, upon such execution, cause the one or more computers to perform operations comprising:
providing an interface through which data is exchanged with a client device;
receiving, through the interface, input specifying (i) a future date range that includes future dates for publication of a content item, and (ii) a distribution goal from among a plurality of distribution goals, wherein the plurality of distribution goals includes having users take a specific action during the future date range;
determining, using a model generated (a) using machine learning and (b) based at least on (i) history data that indicates one or more prior outcomes of processes through which other content items were distributed, and (ii) the distribution goal, an estimated number of unique devices that will be delivered the content item during the future date range;
providing, through the interface, data indicating the estimated number of unique devices that will be delivered the content item during the date range;
varying, during the future date range, a bid used to distribute the content item over multiple impression opportunities based on a statistical likelihood that distribution of the content item will contribute to achieving the distribution goal.

16. The non-transitory computer-readable medium of claim 15, wherein the instructions cause the one or more computers to perform operations further comprising:
in response to interaction with controls within a user interface, updating the user interface to present updated data indicating an updated estimated number of unique devices that will be delivered the content item during the date range according to changes corresponding to the interaction with the controls.

17. The non-transitory computer-readable medium of claim 16, wherein the instructions cause the one or more computers to perform operations further comprising:
receiving, through the user interface, a budget for distribution of the content item, wherein varying the bid comprises generating a proposed bid for publishing the content item over the future date range based on a target budget for distribution of the content item.

18. The non-transitory computer-readable medium of claim 17, wherein generating the proposed bid is further based on a target number of impressions that the content item is to receive.

19. The non-transitory computer-readable medium of claim 18, wherein the proposed bid indicates at least an amount required to win a distribution process for one or more publisher properties during the future date range.

20. The non-transitory computer-readable medium of claim 19, wherein providing the interface comprises providing a graphical user interface that includes (i) first controls that enable a provider of the content item to specify the one or more publisher properties and (ii) second controls that enable the provider of the content item to specify one or more geographic regions to which the content item is to be distributed.

* * * * *